Patented Apr. 30, 1946

2,399,598

UNITED STATES PATENT OFFICE 2,399,598

3-UREIDO-1,2,4-TRIAZOLES AND THEIR PREPARATION

Donald W. Kaiser, Riverside, Conn., assignor to American Cyanamid Company, New York, N. Y., a corporation of Maine No Drawing. Application May 9, 1944, Serial No. 534,803

14 Claims. (Cl. 260—308)

This invention relates to a new class of organic compounds, novel reaction products thereof, and to methods of preparing the same. More particularly, the invention relates to 3-ureido-1,2,4-triazoles and to metal salts and other reaction products thereof.

I have discovered that when an acyl dicyandiamide is mixed with hydrazine in a suitable liquid reaction medium, reaction occurs resulting in the formation of a new class of organic compounds which may be designated as 3-ureido-1,2,4-triazoles. These new compounds have the following structural formula:

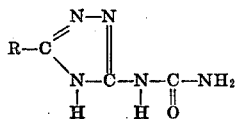

in which R is an alkyl, cycloalkyl, or aryl radical.

The compounds of the present invention are amphoteric, white, crystalline solids slightly soluble in water, more easily soluble in aqueous solutions of alkalis, and more difficultly soluble in acids. The compounds are very weak bases and form salts with strong acids. In general, they are not easily soluble in organic solvents but may be dissolved in Cellosolve (ethylether of diethylene glycol), aliphatic alcohols, pyridine, etc. They melt or decompose at high temperatures, their melting points being somewhat dependent upon the manner in which they are determined.

The compounds of the present invention are useful for a variety of purposes: as dyestuff intermediates, in the preparation of pharmaceuticals, and in the preparation of other useful organic compounds. They are capable of forming characteristically-colored complex salts of heavy metals such as copper, nickel, cobalt, iron, and the like, and for this reason may be of value in analytical chemistry. The new products of the present invention may be hydrolyzed to yield 3-amino-1,2,4-triazoles and may be acylated and alkylated as shown in specific examples 6 and 7.

The acyl dicyandiamides employed in the reaction of the present invention are prepared by simply mixing dicyandiamide with a desired acyl halide or anhydride and a water-soluble alkali metal hydroxide in the presence of a small amount of water and a non-hydroxylated solvent such as acetone.

A very great number of acyl dicyandiamides can be employed in the reaction described herein. Among these may be specifically mentioned: acetyl dicyandiamide, butyroyl dicyandiamide, caproyl dicyandiamide, lauroyl dicyandiamide, stearoyl dicyandiamide, α-bromcaproyl dicyandiamide, γ-nitrovaleroyl dicyandiamide, ω-hydroxy decanoyl dicyandiamide, sebacyl bis-dicyandiamide, adipyl bis-dicyandiamide, benzoyl dicyandiamide, p-nitro benzoyl dicyandiamide, o-carboxy benzoyl dicyandiamide, p-hydroxy benzoyl dicyandiamide, nicotinyl dicyandiamide, α-naphthoyl dicyandiamide, cyclohexylacetyl dicyandiamide, hexahydro benzoyl dicyandiamide, and other alkyl, cycloalkyl, and aryl acyl dicyandiamides.

Hydrazine is a known compound usually available in the form of an acid salt. I may, however, use hydrazine solutions containing free hydrazine or the mono-acid salt such as hydrazine monohydrochloride, dihydrazine sulfate, etc. One of the advantages of the present invention is that aqueous solutions of hydrazine containing 1 per cent or less of hydrazine may be used, in many cases, without sacrificing the yield. This makes it possible to use hydrazine solutions as ordinarily prepared without first concentrating the solution and isolating the hydrazine as an acid salt.

The reaction between acyl dicyandiamides and hydrazine takes place readily at temperatures between about 25° C. and 100° C. or higher. In fact, the reaction is slightly exothermic in character. It is advantageous, however, to apply heat during the first part of the process to initiate the reaction and to bring it to completion in a shorter period of time. A convenient method of conducting the reaction is to mix the reactants in a suitable solvent or diluent and heat the reaction mixture under a reflux condenser until the reaction is complete. After the reaction has once started, it is generally completed within a short period of time, usually within a half hour.

A suitable solvent may be water alone or ethanol, methanol, dioxane, Cellosolve, or a mixture of these solvents with each other or with water. Although I usually dissolve the reactants before heating the reaction mixture, it is not necessary that they be completely dissolved. If desired, one of the reactants may be dissolved in a solvent and the other reactant added thereto in undissolved form.

When free hydrazine is employed, ammonia is evolved from the reaction mixture. When ordinary commercial hydrazine salt is used, the reaction product may be formed as an acid salt because of excess acid in the reaction mixture. I prefer, therefore, to neutralize part of the acid bonded to the hydrazine, leaving only enough acid combined with the hydrazine to form an ammonium salt with the ammonia liberated as a result of the reaction between the hydrazine and the acyl dicyandiamide. Accordingly, a small proportion of an alkali, one or two moles for each mole of hydrazine salt, is usually added to the reaction mixture when using commercial hydrazine.

My invention will now be illustrated in greater detail by means of the following specific examples, in which representative acyl dicyandiamides are condensed with hydrazine under different conditions to yield 3-ureido-5-alkyl (and aryl)-1,2,4-triazoles. These examples also show the formation of characteristic heavy metal salts and the alkylation and acylation of 3-ureido-5-phenyl-1,2,4-triazole. It will be understood, of course, that these examples are given for purposes of illustration and are not to be considered as limiting my invention to the particular details described therein.

*Example 1*

To a solution of 16.5 g. (0.40 mole) of 97% sodium hydroxide in 100 cc. of water was added 42 g. (0.40 mole) of hydrazine dihydrochloride. This solution was then added to a suspension of 37.6 g. (0.20 mole) of benzoyl dicyandiamide in 250 cc. of methanol and the whole refluxed. Within 5 minutes of reflux, a solid cake of product had formed. Water was added, the mixture cooled, and the solid filtered, washed well with water, and air dried. A quantitative yield (41 g.) of material decomposing at 233–235° C. was obtained. Crystallization of the product from a large volume of 50% Cellosolve gave cotton-like needles. The decomposition temperature varied with the rate of heating, but on moderately rapid heating decomposition occurred at 239–240° C. The purified yield was 38 g. or 93.5% of theory. Analysis for carbon, hydrogen, and nitrogen gave values in close agreement with the theoretical values for 3-ureido-5-phenyl-1,2,4-triazole.

The material was alkali soluble, and with the addition of copper sulfate to the alkaline solution a deep violet color developed. Nickel salts gave a deep orange solution. With concentrated solutions both the violet-colored copper and orange-colored nickel complexes crystallized from solution.

*Example 2*

To a suspension of 104 g. (0.80 mole) of hydrazine sulfate in 400 cc. of water was added 34 g. (0.80 mole) of 95% sodium hydroxide. As soon as solution resulted, 101 g. (0.80 mole) of acetyl dicyandiamide was added and the mixture refluxed. Some gas was evolved, and after heating a half hour the mixture was cooled, and the solid filtered and washed with water. The dried solid, 3-ureido-5-methyl-1,2,4-triazole, weighed 68 g. or a crude yield of 60.5%. On gradual heating, decomposition was not detected up to 310° C., but on immersion at 295° C., decomposition occurred. The material dissolved in alkali and in the presence of nickel salts gave an orange solution, while copper produced a violet color. Crystallization from 50% Cellosolve gave an amorphous-appearing solid which decomposed at 307° C. when immersed at that temperature.

*Example 3*

After dissolving 25.50 g. (0.60 mole) of 95% sodium hydroxide in 300 cc. of water, 78 g. (0.60 mole) of hydrazine sulfate was added and then 91 g. (0.50 mole) of caproyl dicyandiamide. The mixture was stirred and heated, but as the caproyl dicyandiamide did not wet well, 200 cc. of Cellosolve was added. As the mixture was still quite bulky, an additional 250 cc. of water and 150 cc. of Cellosolve were added. When reflux occurred, almost complete solution resulted, followed immediately by the formation of a rather granular precipitate. Heating was continued 5 minutes longer, the mixture cooled with ice, and the solid filtered. The colorless solid, 3-ureido-5-n-amyl-1,2,4-triazole, weighed 91 g. and represented a yield of 92.5%.

On gradual heating, decomposition could not be detected, but when the material was immersed at 223–224° C., it melted to a clear liquid which evolved gas and resolidified. Complex colored salts were obtained when alkaline solutions were treated with copper and nickel salts. Crystallization from a large volume of 80% ethanol gave amorphous-appearing solid which decomposed as before at 223–224° C. on immersion at that temperature. Analytical values for carbon, hydrogen, and nitrogen checked closely with theoretical.

*Example 4*

A reaction mixture consisting of 37.6 g. (0.20 mole) of benzoyl dicyandiamide, 26.0 g. (0.20 mole) of hydrazine sulfate, 17.0 g. (0.40 mole) of 97% sodium hydroxide, and 500 cc. of water was heated under a reflux condenser at refluxing temperatures for 15 minutes. During this time a large quantity of ammonia was evolved from the reaction mixture. The mixture was then cooled, and the solid filtered, washed with water, and dried. The melting point of the crude product, 3-ureido-5-phenyl-1,2,4-triazole, was 239–240° C.

*Example 5*

An aqueous solution containing 1% of hydrazine was adjusted to a pH of 5.5 with dilute sulfuric acid. To 950 g. of this solution was added 47.0 g. of benzoyl dicyandiamide. The reaction mixture was then heated under a reflux condenser, but before refluxing occurred the mixture set to a thick, cream-like consistency because of the formation of the product, 3-ureido-5-phenyl-1,2,4-triazole. Additional water was added to thin the mixture, and after a short additional heating period the mixture was cooled, and the solid filtered, washed well with water, and dried. The crude product was recovered with practically a quantitative yield based on the benzoyl dicyandiamide employed. It had a melting point of 238–240° C.

*Example 6*

A mixture of 20.3 g. of 3-ureido-5-phenyl-1,2,4-triazole and 350 cc. of pyridine was heated until complete solution occurred. The solution was then cooled to 0° C. and 15.5 g. of benzoyl chloride added. After standing at room temperature for 5 days, the solution was warmed 30 minutes on a steam bath and poured into a large volume of ice-cold, dilute hydrochloric acid. The resulting precipitate was filtered, washed with water, and air dried. The product, the monobenzoyl derivative of 3-ureido-5-phenyl-1,2,4-triazole, was obtained in a 66.5% yield. After recrystallization from a large volume of 50% Cellosolve, small plate-like crystals decomposing at 223–224° C. were obtained. The mixture was alkali-insoluble, and on analysis gave values in agreement with theoretical for the mono-benzoyl derivative.

Example 7

A stirred mixture of 20.3 g. of 3-ureido-5-phenyl-1,2,4-triazole, 4.25 g. of 97% sodium hydroxide, 12.65 g. of benzyl chloride, and 100 cc. of 50% Cellosolve was refluxed for 30 minutes, during which time the benzyl chloride disappeared, and the mixture became almost neutral. After pouring the reaction mixture into acidified ice water, a gum separated which soon solidified. Filtration gave 28.6 g. of a product which represented a yield of 97.5%. Crystallization first from Cellosolve and then butanol gave glittering needles which decomposed at 234–235° C. The alkali-insoluble material analyzed correctly for the mono-benzyl derivative of 3-ureido-5-phenyl-1,2,4-triazole.

I claim:

1. 3-ureido-1,2,4-triazoles having the general formula

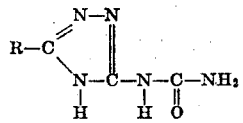

in which R is a member of the group consisting of alkyl, cycloalkyl, and aryl radicals.

2. 3-ureido-1,2,4-triazoles having the general formula

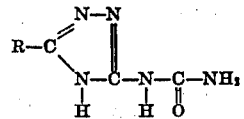

in which R is an alkyl radical.

3. 3-ureido-1,2,4-triazoles having the general formula

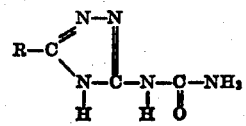

in which R is an aryl radical of the benzene series.

4. 3-ureido-5-phenyl-1,2,4-triazole.
5. 3-ureido-5-methyl-1,2,4-triazole.
6. 3-ureido-5-amyl-1,2,4-triazole.
7. A method of preparing 3-ureido-1,2,4-triazoles which comprises mixing together hydrazine and an acyl dicyandiamide.
8. A method of preparing 3-ureido-1,2,4-triazoles which comprises mixing together hydrazine and an acyl dicyandiamide in a liquid reaction medium and heating the mixture until a 3-uredio-1,2,4-triazole is formed.
9. A method of preparing 3-ureido-1,2,4-triazoles which comprises mixing together in a solvent and heating hydrazine dihydrochloride, an alkali, and an acyl dicyandiamide.
10. A method of preparing 3-ureido-1,2,4-triazoles which comprises mixing together in a solvent and heating hydrazine sulfate, an alkali, and an acyl dicyandiamide.
11. A method of preparing 3-ureido-1,2,4-triazoles which comprises mixing together an aqueous solution of hydrazine with an acyl dicyandiamide and heating the reaction mixture until a 3-ureido-1,2,4-triazole has been formed.
12. A method of preparing 3-ureido-5-aryl-1,2,4-triazole which comprises mixing together in a liquid reaction medium comprising water, hydrazine and an aryl acyl dicyandiamide.
13. A method of preparing 3-ureido-5-phenyl-1,2,4-triazole which comprises mixing together in a liquid reaction medium comprising water, hydrazine and a benzoyl dicyandiamide.
14. A method of preparing 3-ureido-5-alkyl-1,2,4-triazole which comprises mixing together in a liquid reaction medium comprising water, hydrazine and an alkyl acyl dicyandiamide.

DONALD W. KAISER.